United States Patent [19]

Haas et al.

[11] Patent Number: 4,616,447
[45] Date of Patent: Oct. 14, 1986

[54] METHOD AND APPARATUS FOR MACHINING A WORKPIECE ULTRASONICALLY

[75] Inventors: Rudiger Haas, Dunningen; Ernst Krauss, Oberndorf-Aistaig; Herbert Walter, Fluorn-Winzeln, all of Fed. Rep. of Germany

[73] Assignee: Mafell-Saschinenfabrik Rudolf Mey GmbH & Co. KG, Fed. Rep. of Germany

[21] Appl. No.: 583,278

[22] Filed: Feb. 27, 1984

[30] Foreign Application Priority Data

Feb. 26, 1983 [DE] Fed. Rep. of Germany ....... 3306841

[51] Int. Cl.$^4$ .............................................. B24B 7/00
[52] U.S. Cl. ................................. 51/59 SS; 51/165.9; 51/DIG. 11
[58] Field of Search .......... 51/59 SS, 59 R, DIG. 11, 51/165.9, 165.92

[56] References Cited

U.S. PATENT DOCUMENTS

| | | | |
|---|---|---|---|
| 2,358,269 | 9/1944 | Wemhoner | 51/165.9 |
| 2,736,144 | 2/1956 | Thatcher | 51/59 SS |
| 2,791,066 | 5/1957 | Mahlmeister | 51/59 SS |
| 2,991,594 | 7/1961 | Brown et al. | 51/59 SS |

Primary Examiner—Frederick R. Schmidt
Assistant Examiner—J. T. Zatarga
Attorney, Agent, or Firm—McGlew and Tuttle

[57] ABSTRACT

In uninterrupted and neat machining of a workpiece or material, particularly extremely hard material, with an ultrasonic tool is obtained by keeping constant or substantially constant the contact pressure between the tool and the worked surface. This is done, for example, by feeding the tool by means of a spindle sleeve which is mounted for displacement in a feed head. The other end of the spindle sleeve, remote from the tool, is designed as the piston of a feed mechanism. By keeping the pressure P1 in the cylinder space above piston, or the volume of this cylinder space, constant, the contact pressure of the tool remains constant as desired. Since the piston displaced during the matching operation, this displacement must be determined, by means of a displacement pickup, for example. Through a very sensitive contact pressure control on a feed head of the working machine, to which the cylinder of the feed mechanism is secured, can be moved to keep the volume of or pressure in the cylinder space constant.

12 Claims, 3 Drawing Figures

METHOD AND APPARATUS FOR MACHINING A WORKPIECE ULTRASONICALLY

FIELD AND BACKGROUND OF THE INVENTION

This invention relates in general to machining devices and in particular to a new and useful method and apparatus for machining a workpiece ultrasonically.

While working materials or workpieces with ultrasound, the machining tool is pressed against the surface to be worked. This area is also continuously supplied with a suspension of an abrasive in a liquid, preferably water. As soon as the machining tool starts penetrating into the material or workpiece the contact pressure diminishes. This entails a reduction in the infeed of the machining tool, up to a stop of the tool. It is therefore necessary to continually readjust the tool, to restore the contact pressure.

This stepwise repositioning of the tool to restore the contact pressure leads to an unclean machining and extends the working time.

SUMMARY OF THE INVENTION

The invention provides an improvement in a machining workpiece ultrasonically by feeding a tool into a workpiece while the tool is maintained in substantially constant contact pressure with the workpiece. This is advantageously accomplished by feeding the tool with a fluid pressure force which for example may be effected by arranging the tool at the end of a piston rod which extends through the feed heads and which is secured to the piston which runs in a cylinder attached to the feed head. The piston is subjected to pressure on each side and is advantageously set to maintain the piston in balance and as the tool advances in respect to the workpiece, the pressure on one or both sides of the piston is adjusted to maintain the piston in the balanced position and which the tool is maintained at substantially constant engagement pressure with the workpiece.

An at least substantially uniform contact pressure between the tool and the worked surface is obtained by a constant mechanical, magnetic, pneumatic, or hydraulic load applied to the spindle sleeve or the like carrying tool, which load must be continuously monitored through a suitable device to continuously readjust, i.e. increase again the decreased contact pressure. A hydraulic loading of the spindle sleeve appears particularly suitable because the hydraulic fluid being incompressible, the pressure can be controlled exactly without problems. Starting from the assumption that an infeed of the tool is a displacement causing an enlargement of the pressurized space, the pressure may be kept constant in two ways. Either a fluid amount in addition is applied corresponding to the enlargement of the pressure space, or the volume of the pressure space, i.e. the desired volume, is maintained constant. This second method is advantageous for several reasons, particularly also if the infeed motion of the tool is considerable. In addition, with this last mentioned method, the operation can be performed very exactly.

Either of the mentioned methods, and their combinations too, permits minimizing of the operating time. Moreover, a particularly satisfactory result of machining, namely a smooth surface, is obtained.

Todays control technology makes it easy to detect even minimum displacements and thus instantly correct deviations from the desired feed pressure, so that the contact pressure between the tool and the workpiece can be kept quasiconstant.

Advantageously, the displacement of the tool is detected by a pickup and it is compared with a desired displacement and a differential value of the comparator is transmitted to a controller which is associated with either hydraulic or pneumatic servo power for positioning the movement cylinder. The cylinder is advantageously displaced by the controller to restore desired volume in the cylinder for example. Thus the pressure change in the cylinder or auxiliary power operated feed system is compensated by varying the actual volume until the desired volume, and thus also the desired pressure is reached again. Upon attaining the desired pressure in the system, the desired contact pressure between the tool and the work is attained also.

Advantageously, a displacement determined by the displacement pickup is compared in a comparator with a desired displacement value and a differential value of the comparator is transmitted to a controller and either a pneumatic or a magnetic servo power affects the movement of the cylinder or the other hydraulic or pneumatic feed mechanism so that it is displaced by the controller to restore a desired pressure in the pressure cylinder. If the pressure in the cylinder of the feed mechanism drops upon penetration of the tool into the work, further supply of pressure fluid restores the desired contact pressure. The amount of fluid to be supplied in addition depends on the change in the volume of the pressurized space. The control of the desired pressure of volume is continuous or substantially continuous to that contact pressure between the tool and the work may be considered constant.

With the contact pressure effected pneumatically, the pressure may be increased very advantageously in three ways. Either the pressure in the pressure cylinder, etc. is increased by supplying the further compressed air, or the pressure increase is obtained by closing the pneumatic system so that the volume in the pressure cylinder etc. is reduced. A third possibility is to introduce into the cylinder, etc. a liquid, such as oil, so that the space available for the air is reduced and the pressure is augmented. This last mentioned method is insofar advantageous that it produces a great positive pressure gradient with a minimum of displacement.

While taking into account at least the mechanical natural resonance in variation of the pressure gradient in a control system, the differential signal of the comparator is advantageously amplified and shaped to form an adjusted differential signal for a control amplifier. With this "processing", the signal coming from the displacement pickup is also amplified. The comparator also takes into account the variation of the zero reference point of the displacement pickup.

The adjusted differential signal in the control amplifier varies in time as function of the instantaneous phase of the working operation and it is then combined with a signal from the circuit of the working and cooling suspension with the optimzed differential signal thus formed being delivered to the control particularly a four quadrang servo-controller. This optimized differential signal comprises all the variables which are critical for ensuring a very exact desired volume and pressure in the feed mechanism, so that a constant contact pressure can be maintained with the highest precision.

The displacement signal of the displacement pickup is directly transmitted to a device for keeping constant a desired volume or desired pressure in the cylinder of a pneumatic or hydraulic feed mechanism. In such a case, the displacement pickup in the feed mechanism must be designed and conformed to each other to make possible this immediate advance of the feed head. For example an electric motor for advancing the feed head may be controlled directly through an electrical displacement pickup.

Another modification of the invention provides that with a magnetic feed of the tool and a constant magnetic force, the infeed during the penetration of the tool into the work is determined by means of a displacement pickup and converted into a readjustment value by which the magnetic feed mechanism is caused to follow up in proportion to the depth of penetration.

In another modification with a magnetic feed, the motion of the tool penetrating into the material is detected by a displacement pickup and converted into a readjustment value which is then applied to the translator, to reestablish the desired constant pressure of the tool.

With a magnetic feed, the magnetic flux between the stator and the translator is detected by means of a sensor, compared with the desired value, and the differential value from the comparator is supplied to a control wherefrom the translator of the magnetic feed mechanism is supplied to restore the desired contact pressure.

Another object of the invention is to provide a device for carrying out the method of the invention. It is irrelevant whether the displacement pickup is supported directly on the feed head or on a part firmly secured thereto. It is equally irrelevant whether a contact element applies directly against the spindle sleeve, or against a part moved therewith. In principle, it is possible to secure the displacement pickup to the spindle sleeve and the contact element to the feed head. What is important however, is that the spindle sleeve executes relative to the feed head a displacement which is exactly determined, and delivered, as a conveniently converted signal, to the feed mechanism to make a corresponding correction reestablishing the desired contact pressure between to tool and the workpiece.

Another development provides that an ultrasonic converter is provided at the free end of the spindle sleeve and an ultrasonic transformer secured thereto carries the machining tool. At least the ultrasonic converter and the ultrasonic transformer are of conventional design, so that no details of construction and operation are necessary. The machining tool also may, at least basically, be identical with or similar to prior art designs, the specific shape depending on the respective application.

A particularly preferred embodiment provides that the displacement pickup comprises an inductive pickup which is secured to the feed head and whose contact pin or other sensing element is applied against the ultrasonic converter. The ultrasonic converter is provided close to the feed head, so that the size of the displacement pickup can be small.

Another development of the invention provides that while operating with a hydraulic or pneumatic auxiliary power, the end remote from the machining tool of the spindle sleeve is connected to a diaphragm or a piston of a pressure chamber of the pneumatically or hydraulically operating feed mechanism. The pressure in the pressure chamber is kept constant, so that with the other values constant, and with a moving spindle sleeve, the contact pressure remains at the predetermined level. As soon as during the operation the spindle sleeve is displaced, this relative movement is corrected in a suitable manner, for example, by a following movement of the feed head. With a correspondingly designed control system and setting motor or drive, these movements take place continuously so that the contact pressure is quasiconstant.

Another embodiment provides that the pressure chamber is formed by a pneumatic or hydraulic cylinder. Preferably, the cylinder is double-acting, and the two cylinder spaces separated from each other by a diaphragm or a piston are under unequal pressures. The arrangement may be such that a first cylinder space, particularly an annular space, is pressurized with a pressure P1 compensating for the weight of the spindle sleeve and all the parts secured thereto, so that a zero contact pressure is obtained between the tool and the work. Then, the pressure P2 produced in the other cylinder space makes it possible in a simple way to exactly determine, and even vary, the contact pressure. The two pressures may, and do as a rule, differ from each other.

Advantageously, the spindle sleeve is guided in the feed head by means of a ball bearing cage, or a similar element, so that no significant friction is produced in this zone.

A particular embodiment of the invention provides that the displacement pickup is connected to an oscillator-demodulator unit which in turn is connected to a comparator which is connected to a servo-controller, particularly four quadrant servo-controller, with the servo-controller being connected to a drive motor for effecting the feed motion of the feed head or the like and that the drive motor is connected through a tachometer to the servo-controller and the comparator is in addition connected to a desired-value transmitter. The servo controller causes a working motion of the motor by an amount corresponding to this signal, and the speed of execution is monitored by the servo-controller through the tachometer. For this purpose, the tachometer applies to the servo-controller a corresponding voltage. If the controller, the setting motor, etc. are electrically operated devices, the term "connection" is to be understood as "electrically conducting connection".

A further development provides that the oscillator-demodulator unit is connected, through a comparator which is followed by a first control amplifier, to the servo-controller, with this comparator being in addition connected to a device for producing a desired value signal, which means adjustment of the displacement pickup to the zero reference point. The comparator thus compares the adjustable desired value, i.e. the zero reference point of the contact element, with the signal proportional to the relative displacement, and delivers an adjusted differential signal to the servo-controller. Another development provides in this connection that the comparator which is followed by the first control amplifier, is indirectly connected, through a second control amplifier to the servocontroller, with the second amplifier being connected to a signal transmitter for the suspension supply circuit, and to a signal transmitter for optimizing the instantaneous phase of the working operation. To the second control amplifier, a signal is applied informing on the instantaneous phase of a machining operation and thus varying in time the adjusted differential signal from the first control amplifier, and further combined therewith is a signal from the suspension supply circuit, so that finally, the signal leaving the second amplifier is an optimized differential signal to be delivered directly to the servo-controller.

Through the optimized differential signal, the drive of the feed head, etc. is controlled to keep the adjusted pressure in the mentioned cylinder space, or the desired volume therein, and thereby the contact pressure, constant.

The desired value is set through the setting device manually.

In another embodiment the spindle sleeve is provided with an arresting device which is connected in the same way as the second control amplifier, to a signal transmitter.

If in the course of machining, the tool is lifted by a rearward movement of the feed unit, in order to supply suspension to the workpiece, the arresting device locks the movement of the spindle sleeve during this period of time, which movement would take place in the absence of a resistance offered by the workpiece to the tool, so that a machining can continue under the desired contact pressure immediately after the lifting operation is terminated.

In still other developments of the invention the signal transmitter is connected to the second control amplifier, further to an additional arresting device for the feed head, and to a bypass line which can be shut off. Unlike the preceeding one, this embodiment allows a lifting of the tool with the feed mechanism arrested and a non-arrested spindle sleeve, by increasing the pressure P2 in the cylinder space during the period of opening the bypass line, with a simultaneous actuation of the additional arresting device and reducing of the pressure P1 in the cylinder space by means of the second adjustable pressure control device.

A further embodiment is shown by providing a pressure gauge in the cylinder space, and connected to a pressure comparator which is connected to a reference pressure transmitter, on the one hand, and to a pressure control amplifier on the other hand, which in turn is connected to the pressure control device. The actual pressure is measured directly in the cylinder space and delivered directly to the pressure comparator where it is compared with the desired value. The difference is supplied to the pressure control amplifier. This amplifier transforms the signal into a pressure setting signal for the second adjustable pressure control device. This device varies the actual pressure in the cylinder space to reestablish the desired pressure.

Accordingly it is an object of the invention to provide an improved device for machining a workpiece ultrasonically which comprises advancing the tool into the workpiece with a substantially constant pressure.

A further object of the invention is to provide an apparatus for feeding a workpiece using ultrasound which comprises a fluid pressure cylinder having a piston movable therein which is connected to a spindle for carrying the workpiece wherein the pressure in the cylinder on each side of the piston is maintained so that the workpieces engaged at a predetermined constant pressure and any variation from this pressure due to the change of position of the tool relative to the workpiece is compensated by adjusting the pressure acting on the piston.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
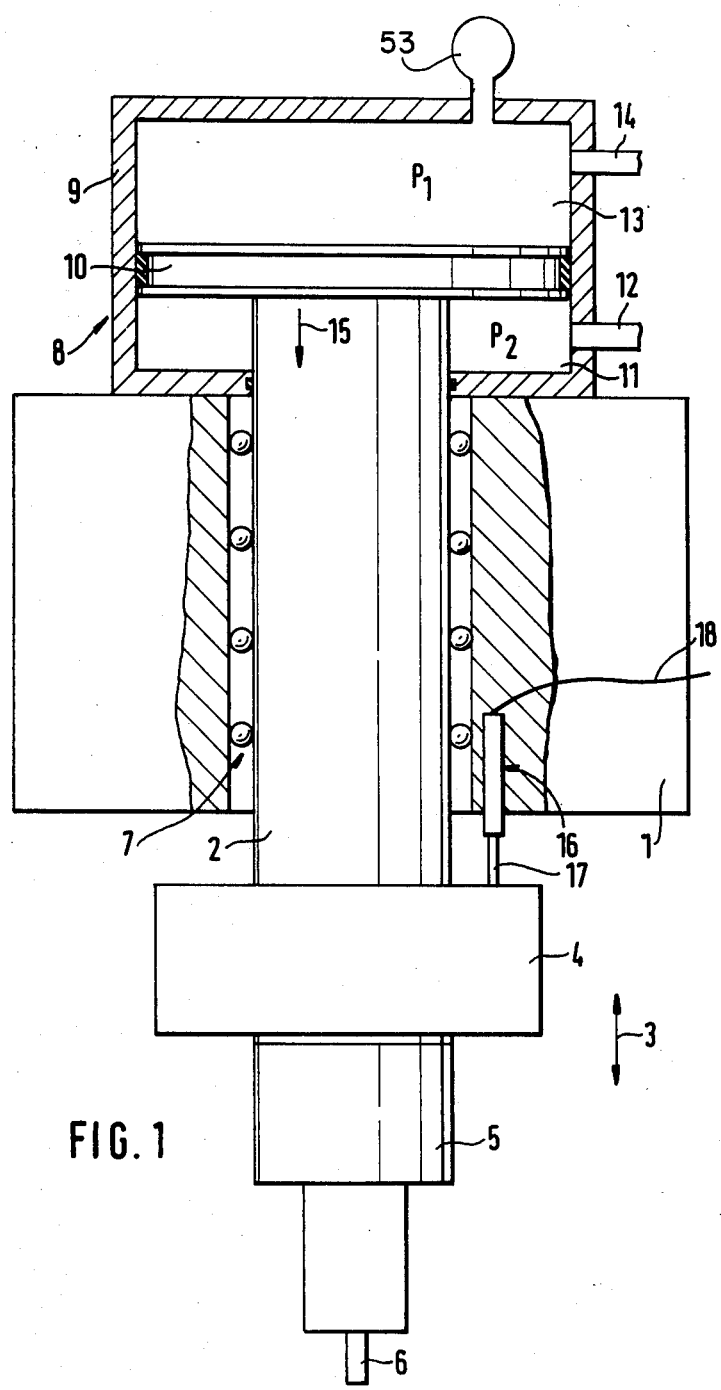
FIG. 1 shows diagrammatically a spindle sleeve mounted for displacement in a feed head, and carrying the working tool.

In a feed head 1 of an ultrasonic machine, a spindle sleeve 2 is mounted for upward and downward displacement in the direction of arrow 3. On its lower end, according to FIG. 1, spindle sleeve 2 carries an ultrasonic converter 4 of known design. The converter is followed downwardly by an ultrasonic transformer 5, frequently called a "snout", which is connected to an ultrasonic machining tool 6. In accordance with the invention, this tool is pressed with a constant contact pressure against the material or workpiece to be machined, which, particularly is an extremely hard material, such as a ceramic material, having a hardness approaching that of a diamond. To reduce the friction during displacement, a ball bearing cage 7 is provided between the spindle sleeve 2 and the feed head 1.

Figure 2:
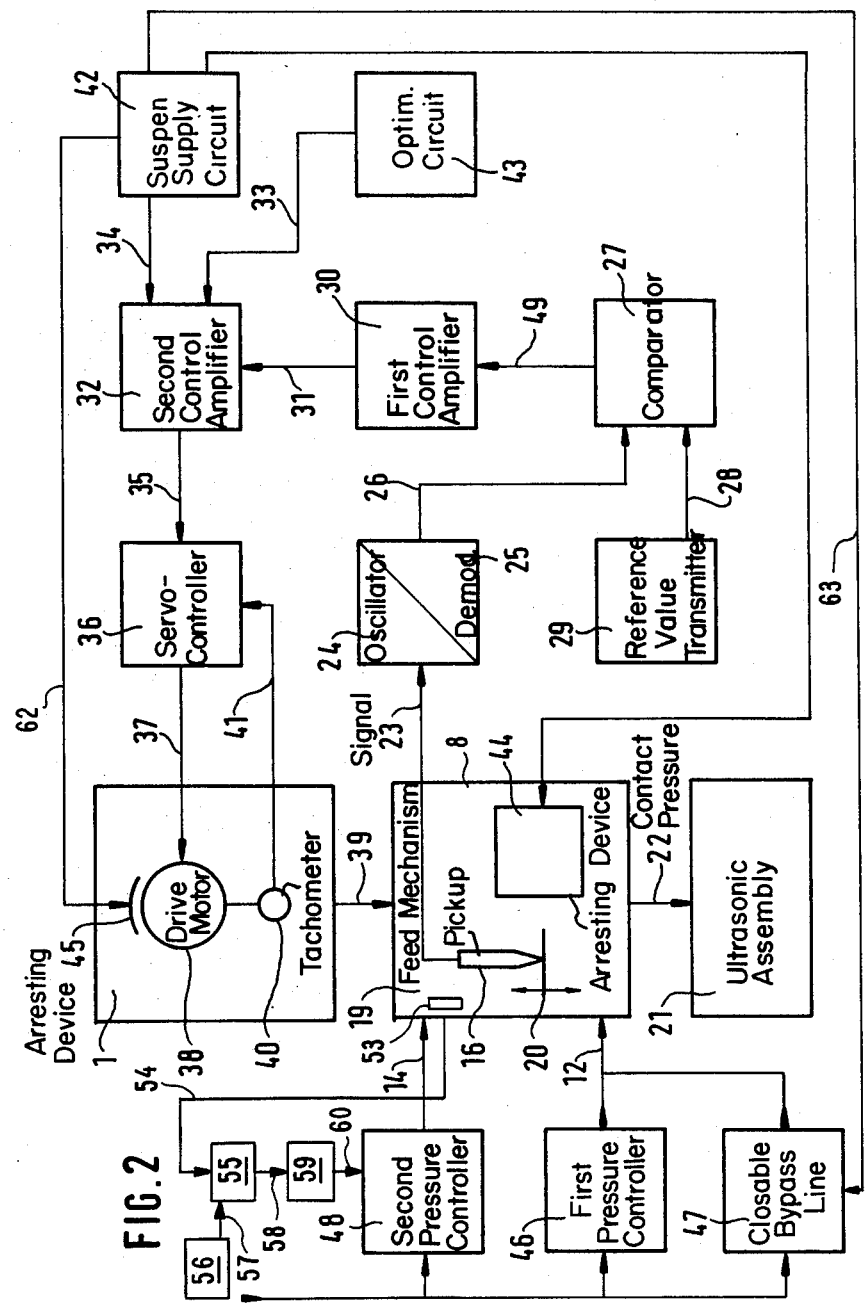
FIG. 2 is a block diagram of a pneumatic or hydraulic control of the contact pressure of the working tool.

On the other end of the spindle sleeve 2, remote from the working tool, a pressure fluid feed mechanism 8 is provided which is operated hydraulically or pneumatically. This mechanism ensures a constant contact pressure between the working tool 6 and the workpiece or material. In the shown example, the feed mechanism comprises a double-acting hydraulic or pneumatic cylinder 9 and a piston 10. Pressure fluid is supplied into the annular cylinder space 11 through a first connection 12 and a first pressure control 46 (FIG. 2.). Through a second connection 14 and a second pressure control 48, cylinder space 13 is pressurized. The pressure in cylinder space 11 is strong enough to compensate for the downwardly directed force produced by the weight of spindle sleeve 2 and of all the parts secured thereto, including piston 10, so that with no pressure in cylinder space 13, working tool 6, even if in contact, does not exert any pressure on the workpiece or material to be machined.

A definite pressure is obtained by supplying pressure fluid into cylinder space 13.

If the feed mechanism is operated hydraulically, i.e. the operating fluid is a liquid, a so called "open system" is provided, and a quite definite contact pressure can be obtained by presetting a definite pressure in cylinder space.

During the machining, as soon as the tool penetrates into the material, spindle sleeve 2 is displaced in the direction of arrow 15 and piston 10 is displaced along therein. Consequently, the volume of cylinder space 13 increases and the pressure decreases. To maintain a constant contact pressure in accordance with the invention, this increase in the volume of cylinder space 13 must be prevented.

For this purpose, a displacement pickup 16, preferably an inductive one, with a contact member 17 is provided on feed head 1. The feed end of contact member 17 applies against ultrasonic converter 4, for example. A reference point zero is set in advance, corresponding to the desired volume of cylinder space 13. As soon as cylinder sleeve 2 moves in the direction of arrow 15, pickup 16 delivers an electric signal corresponding to the displacement to a contact pressure control which will be described hereinafter. The signal is transmitted through a line 18.

While taking into account still other parameters of the system, the signal corresponding to the displacement is transformed into a control signal for a feed motor (38 in FIG. 2) by which heed head 1 is also displaced in the direction of arrow 15 by the same distance by which spindle sleeve 2 and tool 6 have been displaced. Since head 1 is firmly connected to cylinder 9, the desired volume of cylinder space 13 is restored again, and the zero position of pickup 16 is reestablished. The feed motor forms first feed means for the working tool. The feed mechanism 8 forms second feed means for the working tool.

The control of the contact pressure, initially for a so-called "open system" operating with a constant volume of cylinder space 13, will now be explained in more detail with reference to FIG. 2.

Block 19 represents feed mechanism or second feed means 8. Displacement pickup 16 cooperates with this mechanism in the manner described above. Mechanism 19 comprises a device 20 for adjusting the level of the contact member. A feed motion with a constant workpiece contact pressure is imparted, as symbolized by arrow 22, to the ultrasonic assembly 21 comprising ultrasonic converter 4, ultrasonic transformer 5, and working tool 6.

The distance through which tool 6 has moved is detected by pickup 16 and transmitted as a displacement signal 23 corresponding to the instantaneous absolute position of spindle sleeve 2 to an oscillator 24 associated with a demodulator 25. Demodulator 25 delivers a signal 26, corresponding to the absolute position of spindle sleeve 2, to a comparator 27 by which, in turn, a signal proportional to the relative displacement of the spindle sleeve is delivered through a line 49 to the following first control amplifier 30. The desired value signal 28, with which the zero reference point of the displacement pickup is set, comes to comparator 27 from a reference value transmitter 29. From the first control amplifier 30, an adjusted differential signal 31 is applied to a second control amplifier 32. This amplifier in addition receives a signal 33 from a circuit 43 for optimizing the working operation, and a signal 34 from a suspension supply circuit 42. These three values combine to an optimized differential signal 35 which is forwarded to a four quadrant servo-controller 36. This controller is connected through a line 37 to a drive motor 38 for feed head 1. Motor 38 causes a feed motion 39 of double acting cylinder 9 relative to spindle sleeve 2 and tool 6. This relative motion terminates as soon as displacement pickup 16 delivers a signal corresponding to the zero reference point. The relative displacement of cylinder 9 restores the desired volume of cylinder space 13. The speed of motor 38 is determined by a tachometer 40 and applied as a corresponding voltage 41 to four quadrant servocontroller 36.

The pressure in cylinder space 13 is P1, and in cylinder space 11 is P2. As mentioned above, pressure P2 compensates for the weight of all the parts immovably fixed to tool 6, so that pressure P1 alone determines the contact pressure between the tool and workpiece.

Pressure P1 in cylinder space 13 is measured directly by a pressure gauge 53. This actual value of pressure P1 is supplied to a pressure comparator 55 where it is compared with the set desired value P1 supplied from 56 over line 57. If the values differ, a differential signal 58 is formed which is processed in pressure control amplifier 59 to a pressure adjustment signal 60 by which pressure P1 is firmly additionally adjusted through the second, adjustable pressure controller 48.

If during the time provided for the machining operation, it is wanted to lift the tool temporarily from the workpiece, to improve the suspension supply to the working area, this may be done in two ways. Either spindle sleeve 2 is temporarily stopped by means of an arresting device 44 and simultaneously, by means of drive motor 38, feed head 1 is temporarily moved back and ahead again, or feed head 1 is stopped by an additional arresting device 45 over line 62, and simultaneously pressure P1 is reduced by means of the adjustable second pressure controller 48, and pressure P2 is increased by means of a bypass line 47 which can be shut off by a signal on line 63 from circuit 42. Then, after reestablishing the desired condition for the working operation, the machining is continued.

With a "closed system" of operation, a desired value signal is supplied to comparator 27 as an input forming the zero reference point for the displacement pickup. This desired value determines the pressure in cylinder space 13.

In such a closed system, the optimized differential signal 35 is used for bringing the pressure in cylinder space 13, through the four quadrant servo-controller 36, back to the desired value, or to keep it constant at this value. No further basic differences between the closed and open systems are provided.

If the tool is temporarily to be lifted from the workpiece, to improve the suspension supply in the working area, this may be done in the "closed" system in contradistinction to the "open" one, only in one way, namely by temporarily stopping spindle sleeve 2 by arresting the device 44 and simultaneously moving feed head 1 by means of drive motor 38 back and forth again. The operation may then continue under improved conditions.

Figure 3:
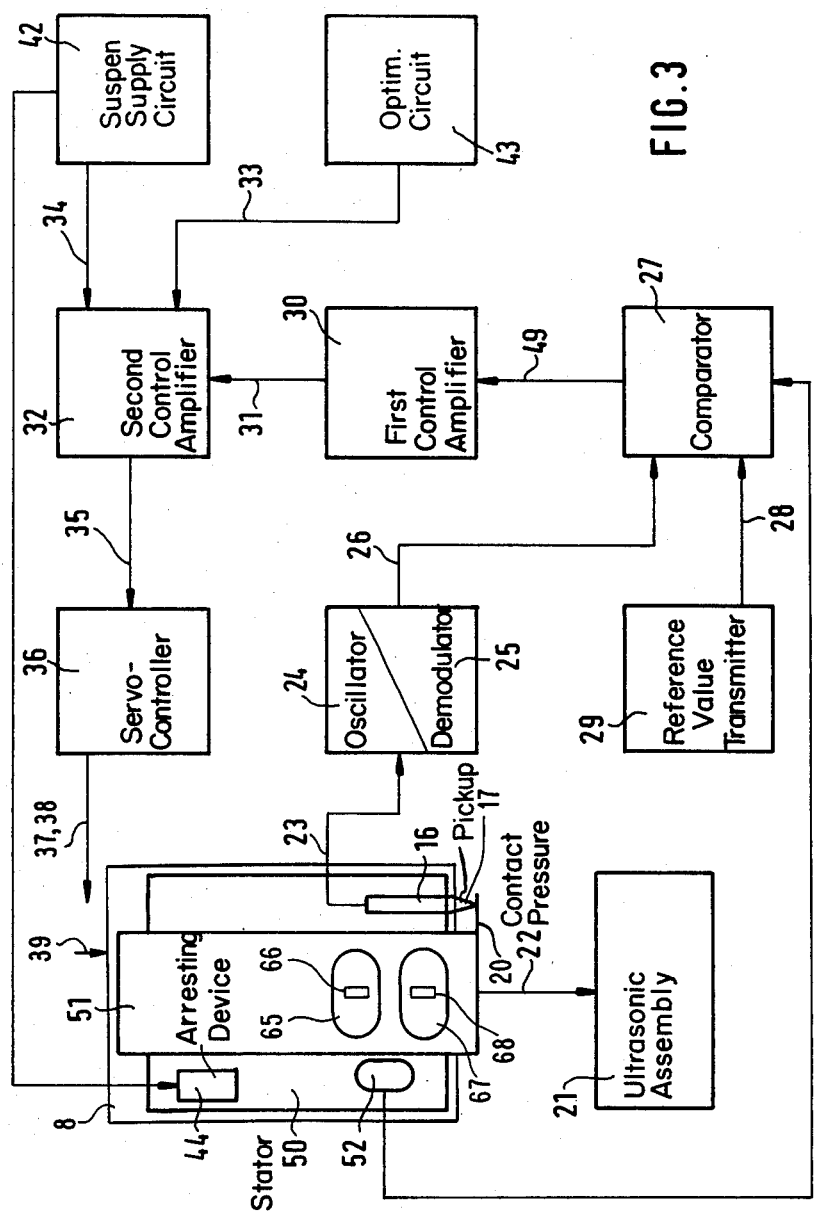
FIG. 3 is a block diagram, enlarged relative to FIG. 2, of the three modifications of a magnetic contact pressure control of the working tool.

As far as FIG. 3 corresponds to FIG. 2, like parts and lines as well as reference numerals are employed. According to FIG. 3, a magnetically operating feed device 8 is provided at the side remote from tool 6 of spindle sleeve 2. The magnetic device 8 ensures a constant contact pressure between tool 6 and the workpiece. This is done by means of a double magnetic field 65 and 67, producing its effect on a translator which is nondisplaceably connected to the spindle sleeve. The induction by magnetic field 67 is strong enough to compensate for the downwardly acting force produced by the weight of spindle sleeve 2 and all the parts secured thereto including the translator. Consequently, with no induction by magnetic field 65, tool 6 does not exert any contact pressure on the workpiece or material to be machined. A definite contact pressure is obtained by subsequently definitely raising the induction by magnetic field 65.

During the machining operation, as soon as tool 6 penetrates into the workpiece, both spindle and sleeve tool and translator 51 are displaced downwardly. This enlarges the magnetically effective air gap in magnetic field 65, and the induction as well as the contact pressure decrease. However, since the contact pressure is to be kept constant in accordance with the objective of the invention, an enlargement of the magnetically effective air gap in magnetic field 65 must be prevented. Magnetic field 67 has an air gap 67.

For this purpose, a displacement pickup 16, preferably an inductive one, including a contact member 17 is provided on feed head 1. The free end of contact member 17 applies against ultrasonic converter 4, for example. Initially, a zero reference point is set which is associated with the desired width of the magnetically effective air gap in magnetic field 65. As soon as spindle sleeve 2 becomes displaced in the downward, pickup 16 delivers an electric signal corresponding to the displacement to a contact pressure control which will be described hereinafter. The signal is transmitted through line 18 (shown in FIG. 1).

While taking into account further parameters of the system, the signal is then transformed into a control signal for a feed motor by which feed head 1 also is displaced in the downward direction through the same distance through which spindle sleeve 2 with tool 6 have been displaced. Since the stator 50 of feed mechanism 8 is firmly connected thereto, the magnetically effective air gap in magnetic field 65 is reduced to the desired width again and pickup 16 returns into its zero position.

In the following and with reference to FIG. 3, the control of the contact pressure will be explained for a system with a socalled "fixed translator", where the magnetic effective air gap in magnetic field 65 is constant.

Block 8 represents the feed mechanism 8. This mechanism cooperates with the displacement pickup 16 in the described manner. Pickup 16 includes a device for setting the level 20 of the contact pin. A feed motion with a constant contact pressure between the tool and the workpiece is imparted as symbolized by arrow 22, to the ultrasonic assembly 21 comprising ultrasonic converter 4, ultrasonic transformer 5 and ultrasonic tool 6.

The distance which tool 6 has moved is detected by pickup 16 and transmitted as a displacement signal 23 corresponding to the instantaneous absolute position of spindle sleeve 2 to an oscillator 24 associated with demodulator 25. Demodulator 25 delivers a signal 26 corresponding to the absolute position of the spindle sleeve to a comparator 27 by which, in turn, a signal proportional to the relative displacement of spindle sleeve is delivered through a line 49 to the following first control amplifier 30. The desired value signal 28 with which the zero reference point of the displacement pickup is set comes to comparator 27 for a setting device 29. Comparator 27 also gets a signal from a sensor 52 which measures magnetic flux. From the first control amplifier 30, an adjusted differential signal 31 is applied to a second control amplifier 32. This amplifier in addition receives a signal 33 from a circuit 43 for optimizing the working operation and a signal 34 from the suspension supply circuit. These three values combine to an optimized differential signal 35 which is forwarded to a four quadrant servo-controller 36. The controller is connected through a line 37 to a drive motor 38 for feed head 1. Motor 38 causes a feed motion 39 of stator 50 relative to translator 51 and thus relative to spindle sleeve 2 and tool 6. This motion terminates as soon as pickup 16 delivers a signal corresponding to the zero reference point. The relative displacement of stator 50 reestablishes the magnetically effective air gap in magnetic field 65 in its desired width. The speed of motor 38 is signalled to four quadrant servo-controller 36 through a tachometer 40 delivering a corresponding voltage 41.

Magnetic field 65 produces an induction B1 and magnetic field 67 and induction B2. As explained above, the latter compensates for the weight of all the parts non-displaceably connected to tool 6, so that only induction B1 determines the contact pressure between the tool and the workpiece.

While operating with a "sliding translator", comparator 27 is supplied with a desired value signal 28 presetting the desired induction by magnetic field 65.

With a "sliding translator", the optimized differential signal 35 is used for restoring through four quadrant controller 36 the desired value of the magnetic induction by magnetic field 65, or for keeping it constant.

While specific embodiments of the invention have been shown and described in detail to illustrate the application of the principles of the invention, it will be understood that the invention may be embodied otherwise without departing from such principles.

What is claimed is:

1. A method of machining a workpiece by means of ultrasound using an ultrasonic machine having a tool head for movement toward and away from the workpiece on a feed path, and an ultrasonic machine tool mounted for movement on the tool head and with respect to the tool head toward and away from the workpiece on the feed path, comprising feeding the tool head on the feed path toward the workpiece to establish a contact pressure between the machine tool and the workpiece which is maintained substantially constant, measuring an instantaneous absolute displacement of the machine tool on the tool head in the feed path and from a zero reference point as the machine tool penetrates the workpiece to form a displacement signal corresponding to the instantaneous absolute displacement, using the displacement signal to feed the tool head so as to maintain the substantially constant contact pressure between the machine tool and the workpiece, and repositioning the machine tool to its zero reference point on the tool head by moving the machine tool along the feed path.

2. A method according to claim 1, including using a displacement pickup to measure the instantaneous absolute displacement and form the displacement signal, using a pressure fluid feed mechanism for repositioning the machine tool on the tool head, using a controller for feeding the tool head, the controller being operatively connected to the pressure fluid feed mechanism for supplying pressure to the pressure fluid feed mechanism, and converting the displacement signal into a pressure for the controller to apply to the pressure fluid feed mechanism when a contact pressure between the machine tool and the workpiece drops so as to maintain the contact pressure substantially constant.

3. A method according to claim 2, including comparing the displacement signal with a desired displacement for the machine tool to obtain a differential value and applying the differential value to the controller as the pressure for the pressure fluid feed mechanism, the pressure fluid feed mechanism comprising a cylinder connected to the tool head and a piston movable in the cylinder connected to the machine tool, the piston dividing the cylinder into two chambers, the pressure from the controller being applied to one of the chambers for establishing a desired volume of that chamber.

4. A method according to claim 3, wherein variations in the contact pressure between the machine tool and the workpiece have a mechanical natural resonance which is characteristic of the workpiece, amplifying and shaping the differential signal to form an adjusted differential signal which is optimized for the mechanical natural resonance of the variations in contact pressure.

5. A method according to claim 2, wherein the pressure fluid feed mechanism comprises a cylinder connected to the tool head and a piston connected to the machine tool and movable in the cylinder, the pressure which is converted from the displacement signal being selected as a desired operating pressure for supply to the cylinder for displacing the piston.

6. A method according to claim 1, wherein the tool head has a stator for producing a magnetic field, the machine tool having a translator connected thereto and movably mounted on the tool head to move due to the magnetic field, the stator and its interaction with the translator repositioning the machine tool on the tool head, using a displacement pickup for measuring the instantaneous absolute displacement and for generating the displacement signal, and using a servo-controller operatively connected to the tool head for feeding the tool head, the controller receiving the displacement signal for moving the tool head.

7. A device for machining a workpiece by means of ultrasound, comprising a tool head, a spindle sleeve mounted for displacement on the tool head in a direction toward and away from the workpiece on a feed path, an ultrasonic machine tool connected to said spindle sleeve for movement on the feed path, a displacement pickup engaged between said tool head and said spindle sleeve for measuring relative displacement between said spindle sleeve and said tool head on the feed path, first feed means operatively connected to said tool head and being connected to said displacement pickup for receiving signals from said displacement pickup, said first feed means being operatively connected for moving said machine tool toward the workpiece at a rate to maintain a substantially constant contact pressure between the machine tool and the workpiece, and second feed means connected between said tool head and said machine tool for repositioning said machine tool to a reference zero position on said tool head.

8. A device according to claim 7, wherein said first feed means comprises a fluid pressure cylinder connected to said tool head, a piston movable in said cylinder and having a rod portion extending through said tool head and carrying said spindle sleeve with said feed tool, an ultrasonic converter carried by said spindle sleeve, said displacement pickup being engaged with said ultrasonic converter, a control connected to said pick-up and being responsive thereto to regulate a pressure in said cylinder on each side of said piston and an ultrasonic transformer carried by said ultrasonic converter and carrying the machine tool.

9. A device according to claim 8, wherein said displacement pick-up comprises an inductive pick-up which is secured to said tool head and includes a contact pin applied against said ultrasonic converter.

10. A device according to claim 9, wherein said cylinder comprises a double-acting cylinder, said piston dividing said cylinder into two opposite spaces, one on each side of said piston.

11. A device according to claim 8, including an oscillator-demodulator unit connected to said pick-up for converting an absolute displacement of said machine tool with respect to said tool head into a displacement signal, a comparator connected to said oscillator-demodulator unit for comparing said displacement signal with a reference value corresponding to a desired displacement of said machine tool, said first feed means including a servo-controller operatively connected to said tool head and connected to said comparator for being controlled by said comparator to move said tool head, said first feed means also including a drive motor connected to said controller for effecting movement of said tool head, a tachometer connected to said drive motor for measuring rotations of said drive motor, said tachometer being connected to said controller for feeding a signal back to said controller for use with a signal from the comparator.

12. A device according to claim 11, wherein said second feed means comprises a feed mechanism connected between said tool head and said machine tool for repositioning said tool head to a zero reference position from which said displacement is measured by said displacement pickup.

* * * * *